United States Patent [19]

Sankrithi et al.

[11] Patent Number: 4,834,420

[45] Date of Patent: May 30, 1989

[54] AIRBAG EQUIPPED CHILD ACCOMODATING DEVICE FOR VEHICLES

[76] Inventors: Usha M. Sankrithi; Mithra M. K. V. Sankrithi, both of 4554 143rd Ave. SE, Bellevue, Wash. 98006

[21] Appl. No.: 176,043

[22] Filed: Mar. 31, 1988

[51] Int. Cl.⁴ ............................................. B60R 21/16
[52] U.S. Cl. .................................. 280/728; 280/734; 280/730; 297/250
[58] Field of Search ............... 280/734, 735, 736, 737, 280/739, 741, 743, 728, 730; 297/216, 250, 254

[56] References Cited

U.S. PATENT DOCUMENTS

| | | | |
|---|---|---|---|
| 3,514,124 | 5/1970 | Richardson | 280/732 |
| 3,753,576 | 8/1973 | Gorman | 280/730 |
| 3,801,156 | 4/1974 | Granig | 297/386 |
| 3,879,057 | 4/1975 | Kawashima et al. | 280/743 |
| 3,917,023 | 11/1975 | DeRosa | 280/735 |
| 3,975,037 | 8/1976 | Hontschik et al. | 280/733 |
| 3,992,028 | 11/1976 | Abe et al. | 280/728 |
| 4,265,468 | 5/1981 | Suszko et al. | 280/729 |
| 4,268,065 | 5/1981 | Granig | 280/737 |
| 4,311,339 | 1/1982 | Heath | 297/216 |
| 4,345,791 | 8/1982 | Bryans et al. | 297/216 |
| 4,381,829 | 5/1983 | Montaron | 280/735 |
| 4,500,135 | 2/1985 | Kincheloe | 297/216 |
| 4,561,675 | 12/1985 | Adams et al. | 280/734 |

FOREIGN PATENT DOCUMENTS 38026  4/1978  Japan .................................. 297/216

OTHER PUBLICATIONS

R. E. Knoedler & C. Dingledy, "Effects of Standard 213 on Design Potential for Child Restraints", 27th Annual Proceedings, American Association for Automotive Medicine, San Antonio, Texas, Oct. 3-6, 1983.

*Primary Examiner*—Kenneth R. Rice

[57] ABSTRACT

This invention provides a child accomodating device which can be secured in a vehicle. Deployable airbag means are provided for protecting a child accomodated in the device, in the event of an accident involving the vehicle. A typical embodiment features an airbag equipped child's car seat, along with accident sensing means and airbag inflation means. In addition to seat-like embodiments, bassinet- and cage- like embodiments and animal accomodating embodiments, also equipped with airbags, are described and claimed. Forward, rearward, and sideward orientations of the child accomodating device are possible, relative to the vehicle.

42 Claims, 5 Drawing Sheets

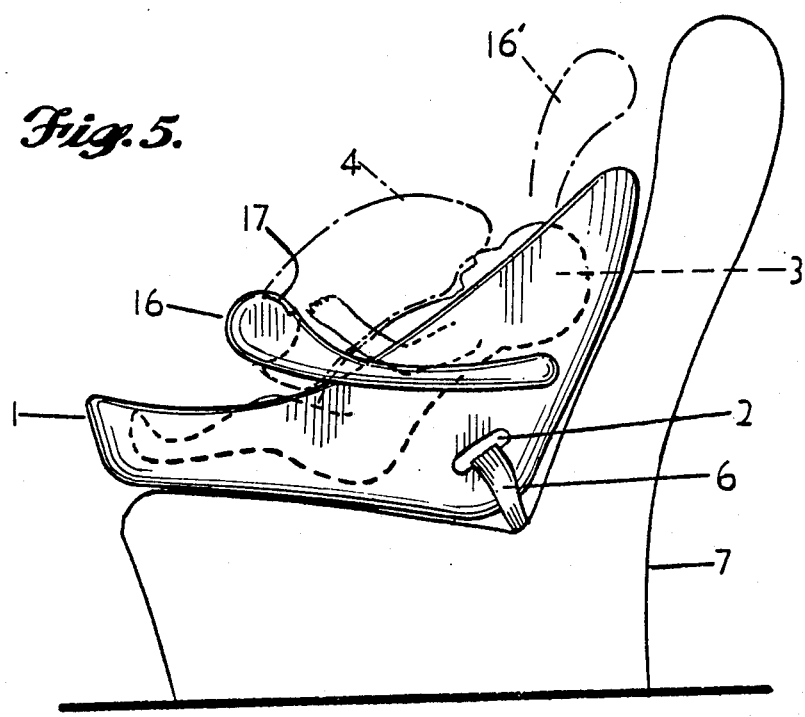
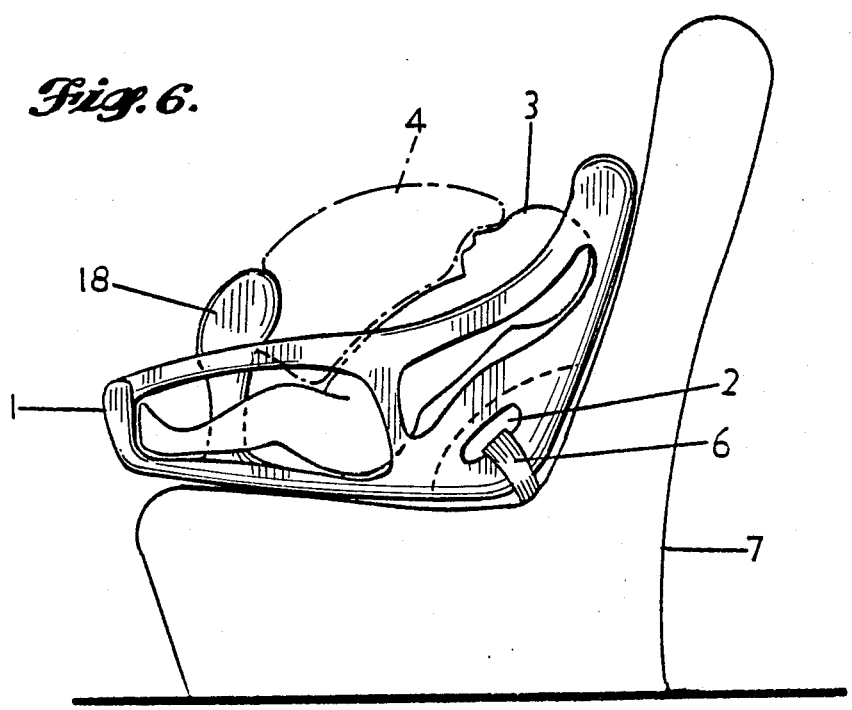

AIRBAG EQUIPPED CHILD ACCOMODATING DEVICE FOR VEHICLES

FIELD OF THE INVENTION

This invention relates to child accomodating car-seats and to other similar devices which accomodate and protect a child in a vehicle.

DISCUSSION OF PRIOR ART

A variety of child-accomodating car-seats exist in the prior art. Forward and rearward facing embodiments exist. A typical prior art car-seat would be secured in a car by one of the car's (adult) seatbelts. The child accomodated would be securely restrained within the car-seat by restraining belts fitted to the car-seat. The restraining belts (typically five point) are intended to protect the child as much as possible in the eent of an accident involving the car in question. However, in order to perform their protection function, the restraining belts must necessarily be fastened snugly around the child, and restrict the mobility of the child seated in the car-seat. This restriction of mobility, and the associated physical and mental discomfort caused to the child, are considered to be significant shortcomings of the prior art.

OBJECTS OF THE INVENTION

Accordingly, it is an object of our invention to provide a child accomodating device for a vehicle which will provide safe and comfortable accomodation for a child, while providing increased mobility of the child accomodated in the absence of conditions hazardous to the child (i.e., in non-accident conditions).

It is also an object of our invention to provide a child accomodating device for a vehicle which will automatically reconfigure to restrain and protect the child within the device, in the presence of conditions hazardous to the child (i.e., in accident conditions).

It is an object of our invention to provide a child accomodating device for a vehicle which utilizes deployment of airbag means for protecting a child accomodated in the child accomodating device, in the event of a sufficiently serious accident involving the vehicle.

It is an object of our invention to provide a child accomodating device for a vehicle which is detachably securable to the vehicle, such that the device can be easily installed in the vehicle when a child is to be transported in the vehicle, and easily removed from the vehicle when no child is to be transported.

Further advantages and objects of the invention will become apparent from a complete consideration of this specification and the accompanying drawings.

BRIEF DESCRIPTION OF THE DRAWINGS

FIG. 5 shows an embodiment with the airbag installation located in a crossbar above the child's legs and in front of the child's torso.

FIG. 6 shows an embodiment with the airbag installation in a pylon projecting upwards between the child's legs.

DETAILED DESCRIPTION

Figure 1:
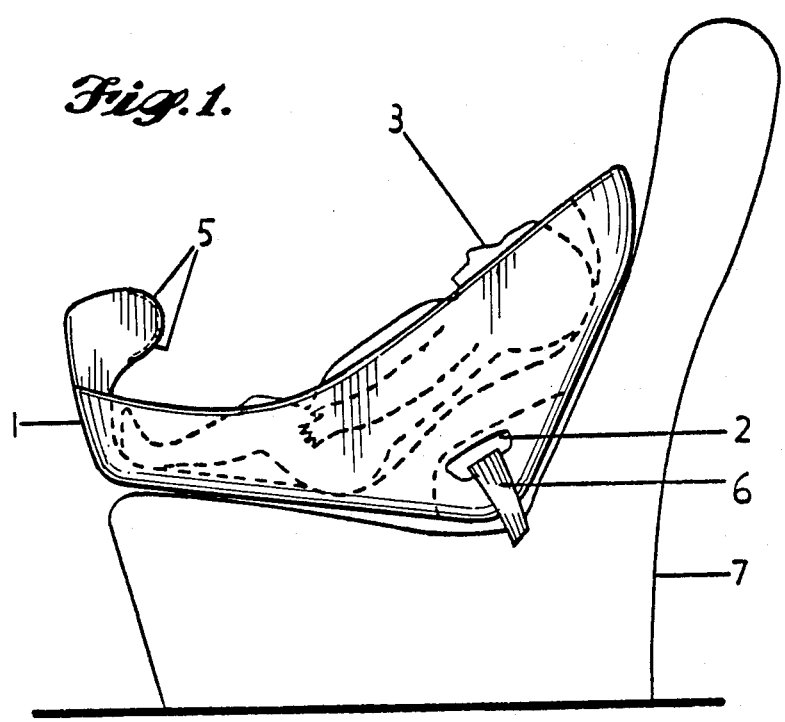
FIGS. 1 and 2 show a side view of a typical embodiment of the invention, with FIG. 1 showing the invention with the airbag undeployed and FIG. 2 showing the same embodiment with the airbag deployed.

FIG. 1 shows a child accomodating and protecting device 1. The child accomodating and protecting device shown is a child protecting seat suitable for accomodating a child 3. is accomodated in a semi-reclining posture in the embodiment shown. A fastener (e.g., vehicle seatbelt) interfacing element 2 is provided in the child accomodating device 1. This fastener interfacing element provides means for permitting the child accomodating device 1 to be secured in a vehicle. The vehicle would typically be an automobile, but may also be any other land, sea, or air vehicle (e.g., van, bus, train, or plane). The fastener interfacing element 2 and the vehicle seatbelt 6 together provide means for securing the child's seat in a vehicle. The child's seat is here shown secured on a vehicle adult seat 7, with the child's seat facing towards the front of the vehicle (to the left on FIG. 1). While the child is shown in a semi-reclining posture, adjustment means or multiple selectable seatbelt interfacing elements may allow the child to be seated in a more upright or reclining posture, as desired. The child accomodating and protecting device 1 is fitted with deployable airbag means (e.g., an inflatable airbag) for protecting a child accomodated in the child accomodating and protecting device 1. However, in FIG. 1 the deployable airbag means is undeployed (i.e., the inflatable airbag is compactly stowed in compartment means for compactly stowing it when it is uninflated) and so not shown. The compartment doors 5 fitted to the compartment means are shown. As indicated by the position of the compartment doors 5, the compartment means is structurally connected to the child's seat and located in the proximity of and above a part of the seat which is intended to accomodate at least a part of the child's legs (here the child's feet). The airbag storage compartment covering doors 5 are shown.

Figure 2:
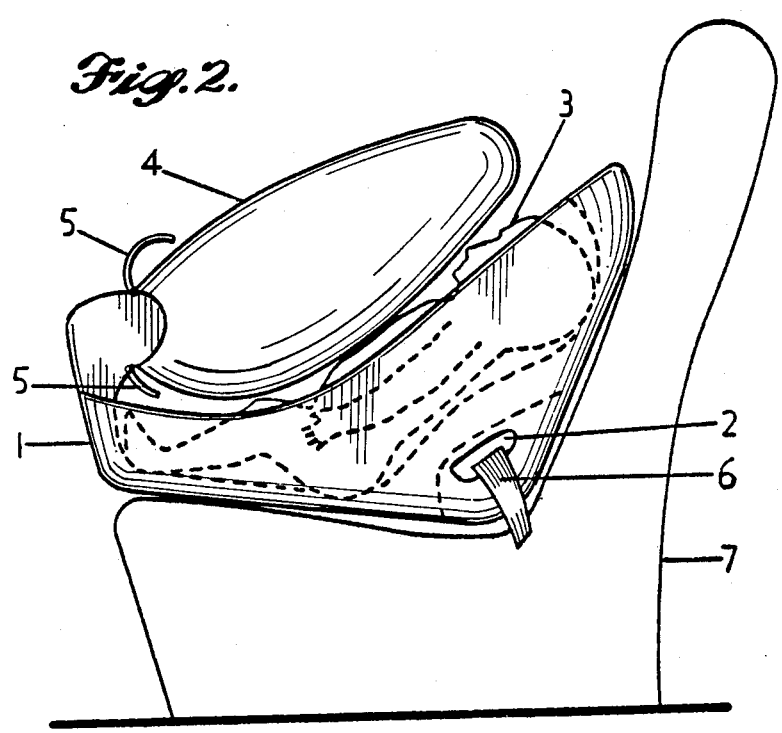

FIG. 2 shows the same embodiment of the invention as FIG. 1, with The deployable airbag means illustrated is an inflatable airbag, which deploys (inflates) when a vehicle condition is sensed indicative of an accident involving the vehicle, and thereby protects the child 3 and restrains the child 3 within the child accomodating and protecting device 1. Note that in the illustrated deployed configuration the compartment doors 5 have been opened by compartment door opening means for permitting the airbag to inflate and expand out of the compartment means to a deployed configuration wherein the airbag occupies a substantial volume in front of the body of the child 3. Embodiments with two or more airbags (which may be mutually exclusive or one within another) are also possible.

Figure 3:
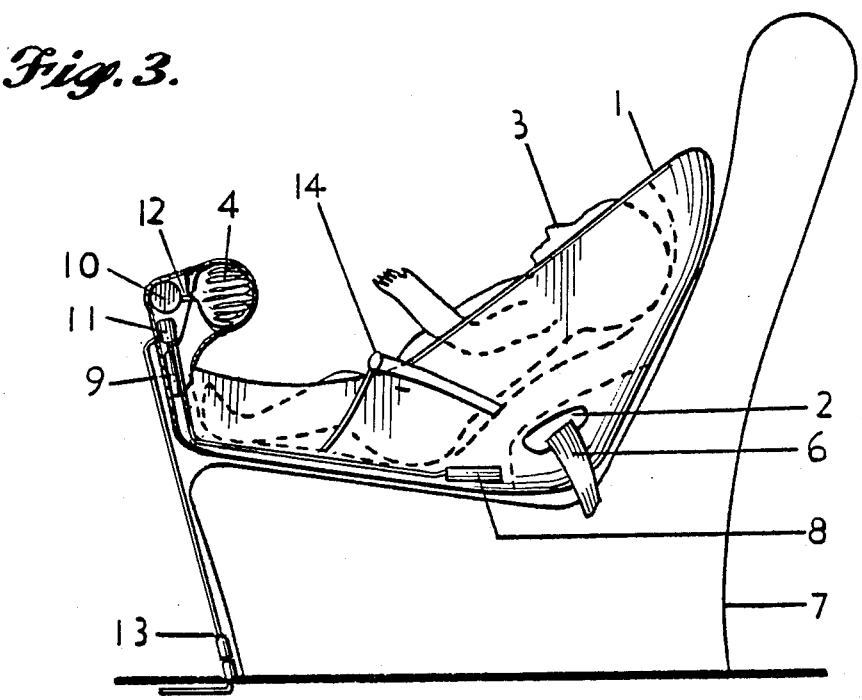
FIG. 3 shows an embodiment similar to FIG. 1, but also shows detail features such as an acceleration sensor, computer, power supply, and gas canister.

FIG. 3 shows a similar embodiment to FIG. 1, but with several additional features illustrated. The deployable airbag means (inflatable airbag) 4 is shown in its undeployed (uninflated) configuration, compactly stowed in compartment means for compactly stowing the inflatable airbag when it is uninflated. As shown, the compartment means is structurally connected to the child's seat which is intended to accomodate at least a part of the child's legs (here the child's feet). At least one acceleration sensor 8 provides means for sensing a vehicle condition, wherein said vehicle condition is a condition which is associated with a situation which would be hazardous to the child 3 were said deployable airbag means 4 to remain undeployed (e.g., an accident situation with high acceleration levels). The means for sensing a vehicle condition also includes computer means 9 for determining, based on sensor inputs, the occurence of such a vehicle condition. The computer means 9 for determining the occurence of such a vehicle condition also provides means for determining the nonoccurence of such a vehicle condition and associated hazardous situation, and thereby provides means for minimizing inadvertent deployment of the deployable airbag means 4 in situations where deployment is unnecessary for protecting child 3. A pressurized gas canister 10 or alternate gas generator (e.g., chemical or phase change) means are provided for inflating the deployable airbag means 4. An energy storage device 11 containing a battery and/or power supply, contributes to the proper operation of the deployable airbag means 4 for protecting the child 3. The sensor means 8, computer means 9, gas canister 10, energy storage device 11, and an orifice control (e.g., valve) mechanism 12 (which can open a gas flow path from the gas canister 10 to the interior of the airbag 4), together provides means for triggering the inflation and automatic deployment of the inflatable airbag when a situation hazardous to the accomodated child is sensed (i.e., in the event of a sufficiently serious accident involving the vehicle). Airbag deployment will restrain the child within the child accomodating device, and reduce peak forces acting on the child in this hazardous situation. Additional provisions may be made at the orifice control mechanism 12 for a user controllable quick deflation path from the airbag to the outside air, thereby providing for the quick and easy removal of child 3 from the child protecting seat subsequent to the event of an accident involving the vehicle. The orifice control mechanism 12, when used by the user to deflate the airbag, also serves as a contributory means for returning the airbag to its undeployed configuration for reuse. Additional contributory means for this purpose may include airbag folding and repacking means and gas/chemical canister recharging means.

Also shown in FIG. 3 is an optical connector cord 13. This connecter cord provides means for power and/or data transfer between the vehicle and the present child accomodating device invention. The connector cord 13 may provide means for utilizing electrical energy from the vehicle to contribute to the proper operation of the deployable airbag means 4 for protecting the child 3. The connector cord 13 may also provide means for data transfer between the vehicle and the child accomodating device 1. Examples of data transfer include vehicle sensor data such as speed, acceleration, tire rotation speed, brake and steering application, engine parameters, and crash sensor parameters. The connector cord 13 may connect with the vehicle's connector mating element close to the vehicle floor (as shown), or close to the seat 7, or close to the buckle of the seatbelt 6, or at any other suitable location.

Finally, from exiting the child accomodating device. Fastenable belt means for restraining the child provide the optional restraint means illustrated here. Note that a variety of two-point, three-point, or five-point belt systems could be used. Note also that the belts need not be as strong or snubly fitted as in "conventional" (i.e., prior-art) car seats, as the belts are not intended to provide crash protection for the child 3 (the airbag provides the protection; the belts only prevent the child from voluntarily exiting the car seat). Conventional quick release mechanisms can be provided for the restraint means 14, to provide additional contributory means for the quick and easy removal of the child 3 from the child protecting seat 1, subsequent to the event of an accident involving the vehicle.

Figure 4:
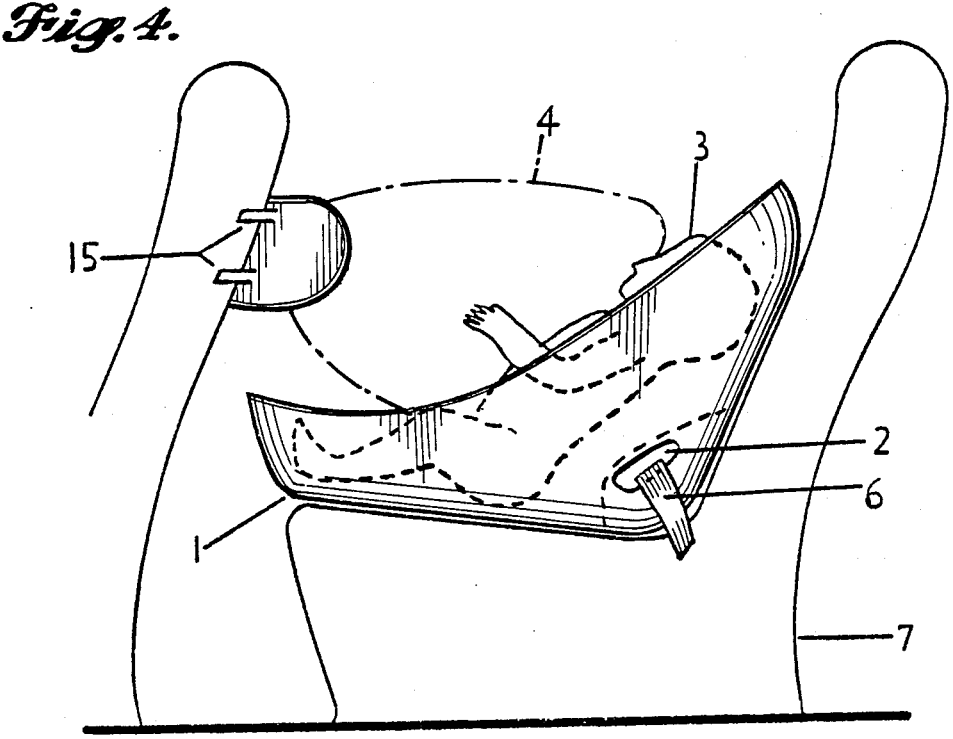
FIG. 4 shows an embodiment in which the airbag installation is not directly connected to the child's car seat.

FIG. 4 shows a child accomodating device 1, wherein the deployable airbag means 4 (shown deployed in dashed lines) is not directly connected to the child accomodating device 1. Conventional connectors 15 of various types can be used to provide means for permitting the deployable airbag means 4 to be secured in the vehicle in an appropriate position such that child 3 will be protected when the deployable airbag means is deployed, as illustrated. In the illustrated embodiment the deployable airbag means 4 is installed behind the seat in front of the child accomodating device, but it could equally well be secured to other vehicle structural elements (e.g., dashboard, roof, pillars, doors).

FIG. 5 illustrates an embodiment wherein the deployable airbag means (inflatable airbag) 4, when undeployed (i.e., uninflated), is contained in compartment means for compactly stowing the inflatable airbag when uninflated. The compartment means is contained in a crossbar assembly 16 situated above the legs and in front of the body of the child 3 to be easily put into/taken out of the child accomodating device 1. Alternate embodiments may have cross-bars pivoted to swing down laterally from one or both sides of the child accomodating device. FIG. 5 also illustrates a child entertainment device 17 comprising entertainment panel attached to the child accomodating device.

FIG. 6 illustrates an embodiment wherein the deployable airbag means (inflatable airbag) 4, when undeployed (i.e., uninflated), is contained in compartment means for compactly stowing the inflatable airbag when uninflated. Pylon means 18 are provided, projecting upwards from the floor of the seat between locations intended to accomodate the legs of the child, for structurally connecting the compartment means to the seat. The deployed configuration of the deployable airbag means is again shown in dashed lines. An upward projecting pylon 18 is illustrated. However, a sideward projecting pylon above one of the child's legs is also possible.

Figure 7:
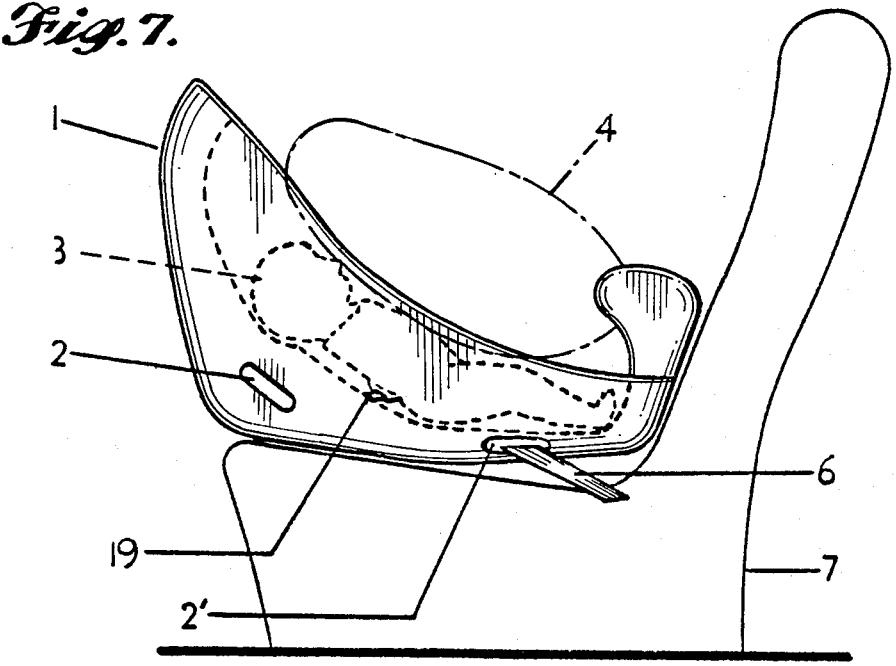
FIG. 7 shows a rearward facing embodiment of the invention.

FIG. 7 shows an embodiment with the child seat 1 facing substantially towards the rear of the vehicle (i.e., towards the right of the page). Additional means 2' for permitting the child seat 1 to be secured in the vehicle, are shown used in conjunction with seatbelt 6 to secure the child seat in the rearward facing configuration. The rearward facing configuration is generally preferable for infants, while the forward facing configuration is generally preferable for toddlers. The same child seat 1 can be installed in a forward facing configuration by turning the child seat around and running seatbelt 6 through means 2 for permitting the child seat to be secured in the vehicle. The provision of both means 2 and additional means 2' for permitting the child seat to be secured in the vehicle in either forward or rearward facing configurations, provides means for making the child seat 1 suitable for the accomodation of either an infant (in the preferred rearward facing configuration for an infant, as illustrated) or a toddler (in the preferred forward facing configuration for a toddler). The greater degree of recline provided for the infant's upper body in FIG. 7 relative to the upperbody recline typically provided for a toddler configuration (e.g., as in FIG. 3) also contributes to the means for making the child seat 1 of FIG. 7 suitable for the accomodation of either an infant or a toddler.

Also shown in FIG. 7 is leash means 19 for securing an article of clothing (e.g., belt holder loop) of the child, to the child seat (i.e., child accomodating device) 1. Such leash means provides an alternative to the restraint means 14 shown in FIG. 3, and serves a similar function. The leash will allow the child some limited mobility, while constraining the child to remain within a zone of safety which will be "covered" by airbag deployment in the event of an accident.

Figure 8:
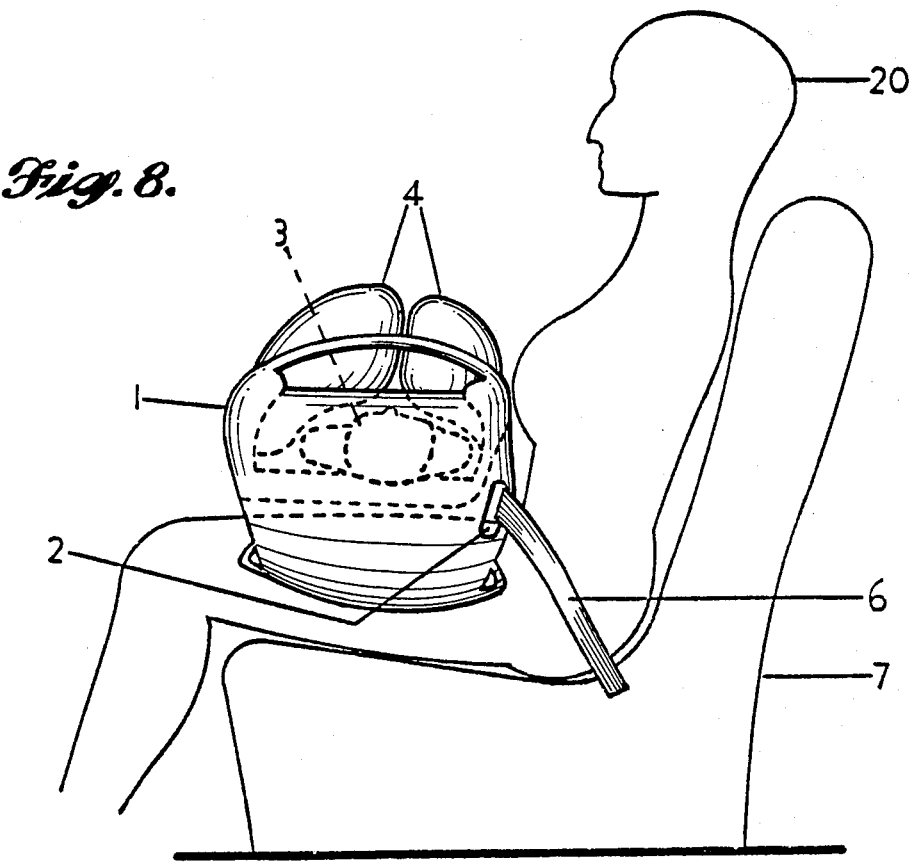
FIG. 8 shows an embodiment in which a bassinet-like child accomodating and protecting device is placed sideways on the legs of an adult seated in the vehicle, and is secured to the vehicle by the adult's seatbelt.

FIG. 8 shows a child accomodating device 1 secured on the lap of an adult 20 seated on the vehicle adult seat 7, with the child accomodating device 1 being secured using the same seatbelt 6 being worn by the adult 20. Combined seat/shoulder belts can also be used in lieu of the seatbelt 6. In the illustrated embodiment, the child accomodating device 1 is secured substantially sideways relative to the vehicle, and accomodates the child 3 in a substantially horizontal posture. While the child is shown back-lying and facing upwards, the child could also be side-lying or lying prone. The child is shown lying on base means for supporting the child in a substantially horizontal posture; with wall means around the periphery of the base means for constraining the child to remain on the base means; open top means for permitting the child to be put into and taken out of the child accomodating and protecting device; deployable airbag means comprising at least one inflatable airbag 4 (two shown) for protecting the child accomodated; and compact stowage means for compactly stowing said inflatable airbag, when it is uninflated, in the proximity of said wall means. The deployable airbag means 4 is shown in its deployed configuration. Note that the illustrated child accomodating device 1 is also designed to double as a bassinet and rocker, when not secured to the vehicle.

Figure 9A:
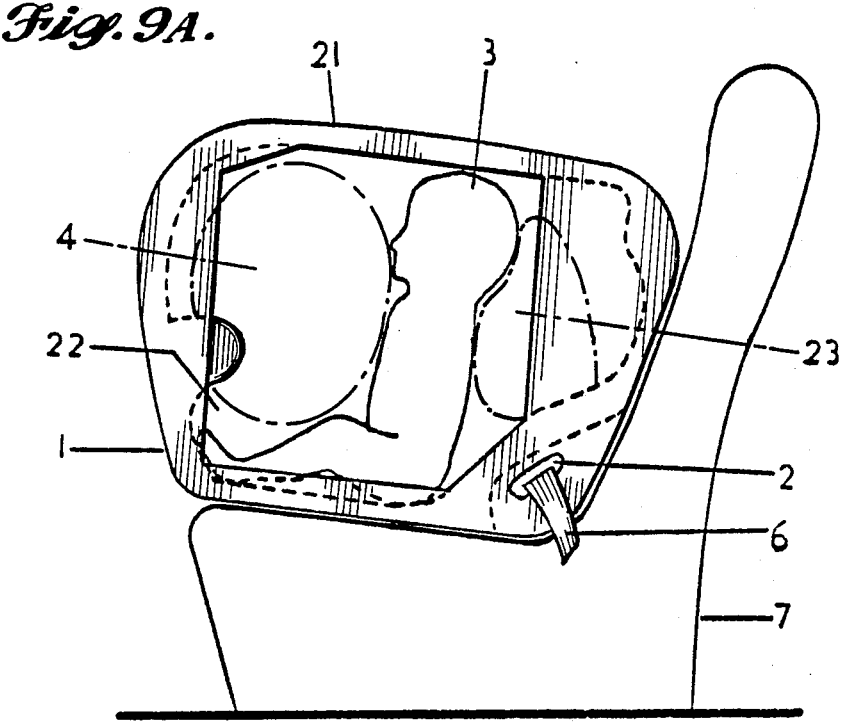
FIG. 9A and 9B show an enclosed cage type of child or animal accomodating device for a vehicle, also equipped with an airbag means to protect the occupant.
Figure 9B:
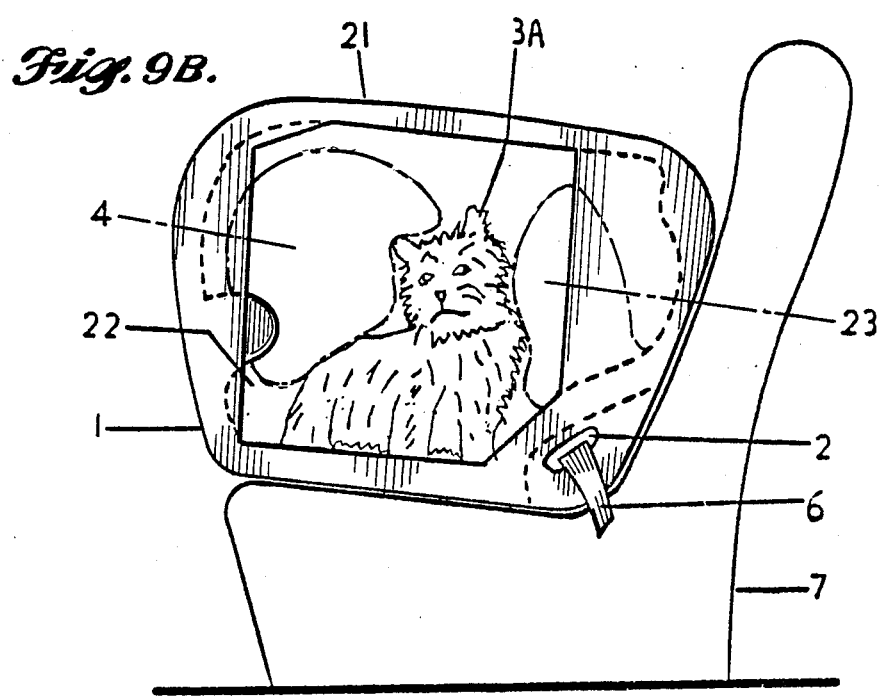

FIG. 9a shows a child accomodating device 1, with a cage 21 providing restraint means for preventing child 3 from exiting the child accomodating device 1. At least one door 22 provides access into the cage 21. A child 3 can be accomodated within the cage 21. In the alternate similar embodiment of FIG. 9b, an animal 3A can be accomodated in place of the child 3. In the latter case the same "child accomodating device" becomes an "animal accomodating device". Means 2 for permitting the child/animal accomodating device to be secured in the vehicle, are used in conjunction with seatbelt 6 to actually secure the device. Deployable airbag means 4 and 23 are compactly stowed in compartment means when undeployed, and deploy to the configuration shown in dashed lines to protect and reduce peak forces acting on the child/animal upon the occurence of a vehicle condition indicative of an accident/hazardous situation. Additional cage side mounted airbags may also be optionally provided.

Variants of the illustrated cage may be configured as cages/playpens with full or partial enclosure (e.g., with open top and/or back), and may accomodate the child-/animal in sitting, standing, lying, or other postures.

While some preferred embodiments of the invention have been described in detail above with reference to the accompanying Figures, it will be understood that still further modifications and variations may be made within the spirit and scope of the invention as defined in the accompanying claims.

What is claimed is:

1. A child accomodating and protecting device, comprising:
   a seat suitable for accomodating a child, means for permitting said seat to be secured in a vehicle,
   deployable airbag means comprising at least one inflatable airbag for protecting a child accomodated in said seat,
   and compartment means for compactly stowing said inflatable airbag when it is uninflated, which compartment means is structurally connected to said seat and located in the proximity of a part of said seat which is intended to accomodate at least a part of said child's legs.

2. The child accomodating and protecting device of claim 1, wherein said compartment means is located in the proximity of a part of said seat which is intended to accomodate said child's feet.

3. The child accomodating and protecting device of claim 1, wherein said compartment means is located above a part of said seat which is intended to accomodate at least a part of said child's legs.

4. The child accomodating and protecting device of claim 1, further comprising means for sensing a vehicle condition, and deployment means for deploying said deployable airbag means upon said vehicle condition being sensed, which deployment means includes inflation means for causing said inflatable airbag to inflate and expand out of said compartment means to a deployed configuration wherein said airbag occupies a substantial volume in front of the body of said child.

5. The child accomodating and protecting device of claim 4, with at least one compartment door fitted to said compartment means, and with compartment door opening means for permitting said airbag to inflate and expand out of said compartment means.

6. The child accomodating and protecting device of claim 4, wherein said means for sensing a vehicle condition includes an acceleration sensor.

7. The child accomodating and protecting device of claim 4, wherein said vehicle condition is a condition which is associated with a situation which would be hazardous to said child were said deployable airbag means to remain undeployed, and wherein said means for sensing a vehicle condition includes computer means for determining, based on sensor inputs, the occurence of such a vehicle condition.

8. The child accomodating and protecting device of claim 7, with means for minimizing inadvertent deployment of said deployable airbag means in situations where deployment is unnecessary for protecting said child, which means for minimizing includes computer means for determining, based on sensor inputs, the nonoccurence of said vehicle condition.

9. The child accomodating and protecting device of claim 4, wherein the deployment of said deployable airbag means reduces peak force levels acting on said child upon the occurence of said vehicle condition.

10. The child accomodating and protecting device of claim 4, with means for returning said deployable airbag means to its undeployed configuration subsequent to the deployment of said deployable airbag means.

11. The child accomodating and protecting device of claim 4, with means for the quick and easy removal of said child from said child accomodating and protecting device, subsequent to the sensing of said vehicle condition and the deployment of said deployable airbag means.

12. The child accomodating and protecting device of claim 1, with pylon means projecting upwards from the floor of said seat between locations intended to accomodate the legs of said child for structurally connecting said compartment means to said seat.

13. The child accomodating and protecting device of claim 1, wherein said compartment means is contained in a crossbar assembly situated above the legs and in front of the body of said child, and further comprising pivotable attachment means for structurally connecting said crossbar assembly to said seat and for permitting said crossbar assembly to be swung away from its position above the legs and in front of the body of said child to enable said child to be easily put into and taken out of said child accomodating and protecting device.

14. The child accomodating and protecting device of claim 1, wherein said means for permitting said seat to be secured includes at least one fastener interfacing element in said child accomodating and protecting device.

15. The child accomodating and protecting device of claim 14, wherein said fastener interfacing element is a vehicle seat belt interfacing element, which permits said child accomodating and protecting device to be secured in said vehicle by a vehicle seatbelt.

16. The child accomodating and protecting device of claim 1, wherein the deployment of said deployable airbag means restrains said child within said child accomodating and protecting device.

17. The child accomodating and protecting device of claim 1, wherein said means for permitting said seat to be secured in a vehicle provide means for said seat to be secured facing substantially towards the front of said vehicle.

18. The child accomodating and protecting device of claim 1, wherein said means for permitting said seat to be secured in a vehicle provide means for said seat to be secured facing substantially towards the rear of said vehicle.

19. The child accomodating and protecting device of claim 1, with pressurized gas canister means for inflating said inflatable airbag.

20. The child accomodating and protecting device of claim 1, with gas generator means for inflating said inflatable airbag.

21. The child accomodating and protecting device of claim 1, further comprising restraint means for preventing said child from exiting said child accomodating and protecting device.

22. The child accomodating and protecting device of claim 21, wherein said restraint means for preventing said child from exiting said child accomodating and protecting device comprises fastenable belt means for preventing said child from exiting said child accomodating and protecting device.

23. The child accomodating and protecting device of claim 21, wherein said restraint means for preventing said child from exiting said child accomodating and protecting device comprises leash means for securing an article of clothing of said child to said child accomodating and protecting device.

24. The child accomodating and protecting device of claim 21, wherein said restraining means for preventing said child from exiting said child accomodating and protecting device comprises a cage.

25. The child accomodating and protecting device of claim 24, wherein said child accomodating and protecting device is also suitable for use as an animal accomodating and protecting device, and wherein said cage provides means for preventing an animal accomodated in said animal accomodating and protecting device from exiting said animal accomodating and protecting device.

26. The child accomodating and protecting device of claim 1, with means for utilizing electrical energy from said vehicle to contribute to the proper operation of said deployable airbag means for protecting said child.

27. The child accomodating and protecting device of claim 1, further comprising an energy storage device which contributes to the proper operation of said deployable airbag means for protecting said child.

28. The child accomodating and protecting device of claim 1, further comprising means for data transfer between said vehicle and said child accomodating and protecting device.

29. The child accomodating and protecting device of claim 1, with means for making the child accomodating and protecting device suitable for the accomodation of either an infant or a toddler.

30. The child accomodating and protecting device of claim 29, wherein provision of means for permitting the child seat to be secured in the vehicle in either rearward or forward facing configurations, respectively, provides said means for making the child accomodating and protecting device suitable for the accomodation of either an infant or a todder.

31. The child accomodating and protecting device of claim 29, wherein said means for making the child accomodating and protecting device suitable for the accomodation of either an infant or a toddler comprises means for permitting an infant to be accomodated with a greater degree of recline than a toddler.

32. The child accomodating and protecting device of claim 1, further provided with at least one child entertainment device attached to said child accomodating and protecting device.

33. An animal accomodating and protecting device, comprising:
a cage suitable for accomodating an animal,
means for permitting said cage to be secured in a vehicle,
deployable airbag means comprising at least one inflatable airbag for protecting an animal accomodated in said cage,
and compartment means for compactly stowing said inflatable airbag when it is uninflated, which compartment means is structurally connected to said cage.

34. The animal accomodating and protecting device of claim 33, further comprising means for sensing a vehicle condition, and deployment means for deploying said deployable airbag means upon said vehicle condition being sensed, which deployment means includes inflation means for causing said inflatable airbag to inflate and expand out of said compartment means to a deployed configuration wherein said airbag occupies a substantial volume in front of the body of said animal.

35. The animal accomodating and protecting device of claim 34 wherein the deployment of said deployable airbag means reduces peak force levels acting on said animal upon the occurence of said vehicle condition.

36. The animal accomodating and protecting device of claim 33, further comprising at least one door fitted to said cage for permitting said animal to be put into and taken out of said cage.

37. A child accomodating and protecting device, comprising:
   base means for supporting a child in a substantially horizontal posture,
   wall means around the periphery of said base means for constraining said child to remain on said base means,
   open top means for permitting said child to be put into and taken out of said child accomodating and protecting device,
   means for permitting said child accomodating and protecting device to be secured in a vehicle,
   deployable airbag means comprising at least one inflatable airbag for protecting said child accomodated in said child accomodating and protecting device,
   and compact stowage means for compactly stowing said inflatable airbag, when it is uninflated, in the proximity of said wall means.

38. The child accomodating and protecting device of claim 37, wherein said child accomodating and protecting device doubles as a bassinet when not secured in a vehicle.

39. The child accomodating and protecting device of claim 37, wherein said child accomodating and protecting device doubles as a rocker when not secured in a vehicle.

40. The child accomodating and protecting device of claim 37, with means for permitting said child accomodating and protecting device to be secured on the lap of an adult seated in said vehicle using the same vehicle seatbelt being worn by said adult.

41. The child accomodating and protecting device of claim 37, wherein said means for permitting said child accomodating and protecting device to be secured, permit said child accomodating and protecting device to be secured in such manner as to accomodate said child oriented substantially sideways relative to said vehicle.

42. The child accomodating and protecting device of claim 37, wherein said means for permitting said child accomodating and protecting device to be secured, permit said child accomodating and protecting device to be secured in such manner as to accomodate said child oriented substantially lengthwise relative to said vehicle.

* * * * *

UNITED STATES PATENT AND TRADEMARK OFFICE
CERTIFICATE OF CORRECTION

PATENT NO. : 4,834,420

DATED : May 30, 1989

INVENTOR(S) : Usha M. Sankrithi & Mithra M.K.V. Sankrithi

It is certified that error appears in the above-identified patent and that said Letters Patent is hereby corrected as shown below:

Column 1, line 19, change "eent" to --event--

Column 2, line 15, change "an airbag means" to --airbag means--

Column 2, line 21, change "is accomodated" to --The child (or occupant) 3 is accomodated--

Column 2, lines 51-53, delete "The airbag storage compartment covering doors 5 are shown."

Column 2, line 55, change "with The" to --with the deployable airbag means 4 shown in deployed configuration. The--

Column 3, line 8, change "child's seat which is intended" to --child's seat and located in the proximity of and above a part of the seat which is intended--

Column 3, line 35, change "together provides" to --together provide--

Column 3, line 55, change "optical" to --optional--

Column 4, line 4, change "Finally, from exiting" to --Finally, FIG. 3 also shows optional restraint means 14 for preventing the child 3 from exiting--

Column 4, line 9, change "snubly" to --snugly--

Column 4, line 38, change "child 3 to be easily" to --child 3. The deployed configuration of the airbag 4 is shown in dashed lines. The crossbar assembly 16 can be swung up to the dashed line position 16', to enable the child 3 to be easily--

UNITED STATES PATENT AND TRADEMARK OFFICE
CERTIFICATE OF CORRECTION

PATENT NO. : 4,834,420

DATED : May 30, 1989

INVENTOR(S) : Usha M. sankrithi & Mithra M.K.V. Sankrithi

It is certified that error appears in the above-identified patent and that said Letters Patent is hereby corrected as shown below:

Column 4, line 43, change "entertainment panel" to --an entertainment panel--

Column 8, line 8, change "restraining" to --restraint--

Signed and Sealed this

Twenty-seventh Day of March, 1990

*Attest:*

JEFFREY M. SAMUELS

*Attesting Officer*     *Acting Commissioner of Patents and Trademarks*